(No Model.)  3 Sheets—Sheet 1.
C. ROGERS.
MACHINE FOR MANUFACTURING INSULATOR PINS FOR TELEGRAPHIC PURPOSES.

No. 350,843.  Patented Oct. 12, 1886.

(No Model.) 3 Sheets—Sheet 2.
C. ROGERS.
MACHINE FOR MANUFACTURING INSULATOR PINS FOR TELEGRAPHIC PURPOSES.
No. 350,843. Patented Oct. 12, 1886.
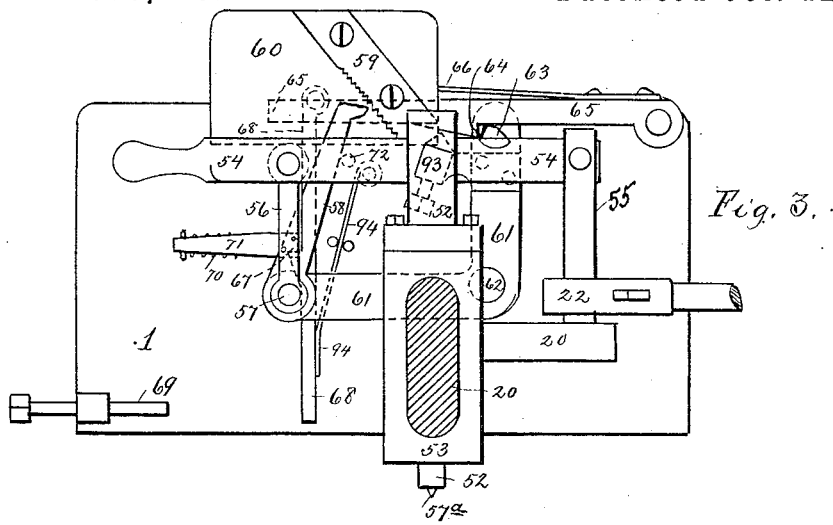
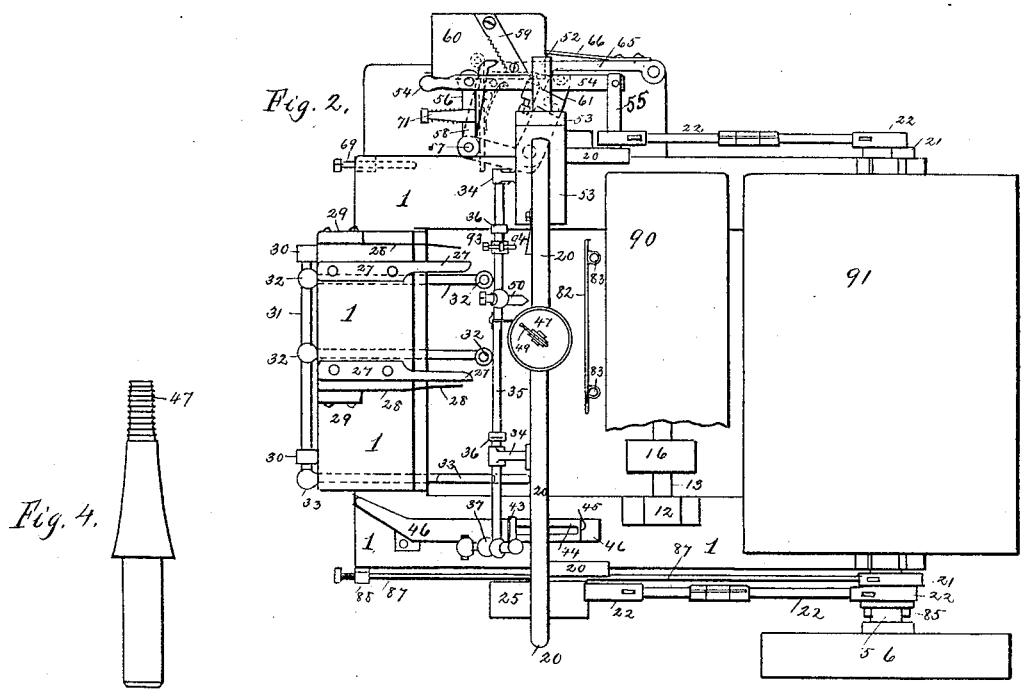
Witnesses:
Inventor.
Charles Rogers
Per O. D. Levis
att'y.

(No Model.)   3 Sheets—Sheet 3.

C. ROGERS.
MACHINE FOR MANUFACTURING INSULATOR PINS FOR TELEGRAPHIC PURPOSES.

No. 350,843.  Patented Oct. 12, 1886.

Witnesses:

Inventor:
Charles Rodgers
Per O. D. Levis
Att'y.

UNITED STATES PATENT OFFICE.

CHARLES ROGERS, OF ALLEGHENY, PENNSYLVANIA.

MACHINE FOR MANUFACTURING INSULATOR-PINS FOR TELEGRAPHIC PURPOSES.

SPECIFICATION forming part of Letters Patent No. 350,843, dated October 12, 1886.

Application filed January 2, 1886. Serial No. 187,487. (No model.)

*To all whom it may concern:*

Be it known that I, CHARLES ROGERS, a citizen of the United States, residing at Allegheny city, in the county Allegheny and State of Pennsylvania, have invented certain new and useful Improvements in a Machine for Manufacturing Insulator-Pins for Telegraphic Purposes; and I do hereby declare the following to be a full, clear, and exact description of the invention, such as will enable others skilled in the art to which it pertains to make and use the same, reference being had to the accompanying drawings, which form part of this specification.

My invention relates to an improvement in insulator-pin turning and threading machines, the objects being to provide a machine whereby a block or piece of wood slightly varying in length may be automatically taken up by the machine, carried to the cutter-head, and remain a sufficient length of time to become shaped, and in traveling back have a tapering screw-thread formed on one end of the pin, and when finished to provide a means for releasing the same a short distance from the place of commencement; also, to provide a means whereby the chips or cuttings of the wood may be conducted away from the working parts of the machine, to provide a means whereby the cutter-head may be covered or concealed while the machine is in the act of releasing the finished pin; to provide a means for regulating the tension or draft on the pins of different length, that each may be held in position with the same degree of pressure; and also to provide a machine that will be automatic in all its working parts; and with these ends in view my invention consists in certain details of construction and combination of parts, as will be more fully explained hereinafter.

Figure 1:
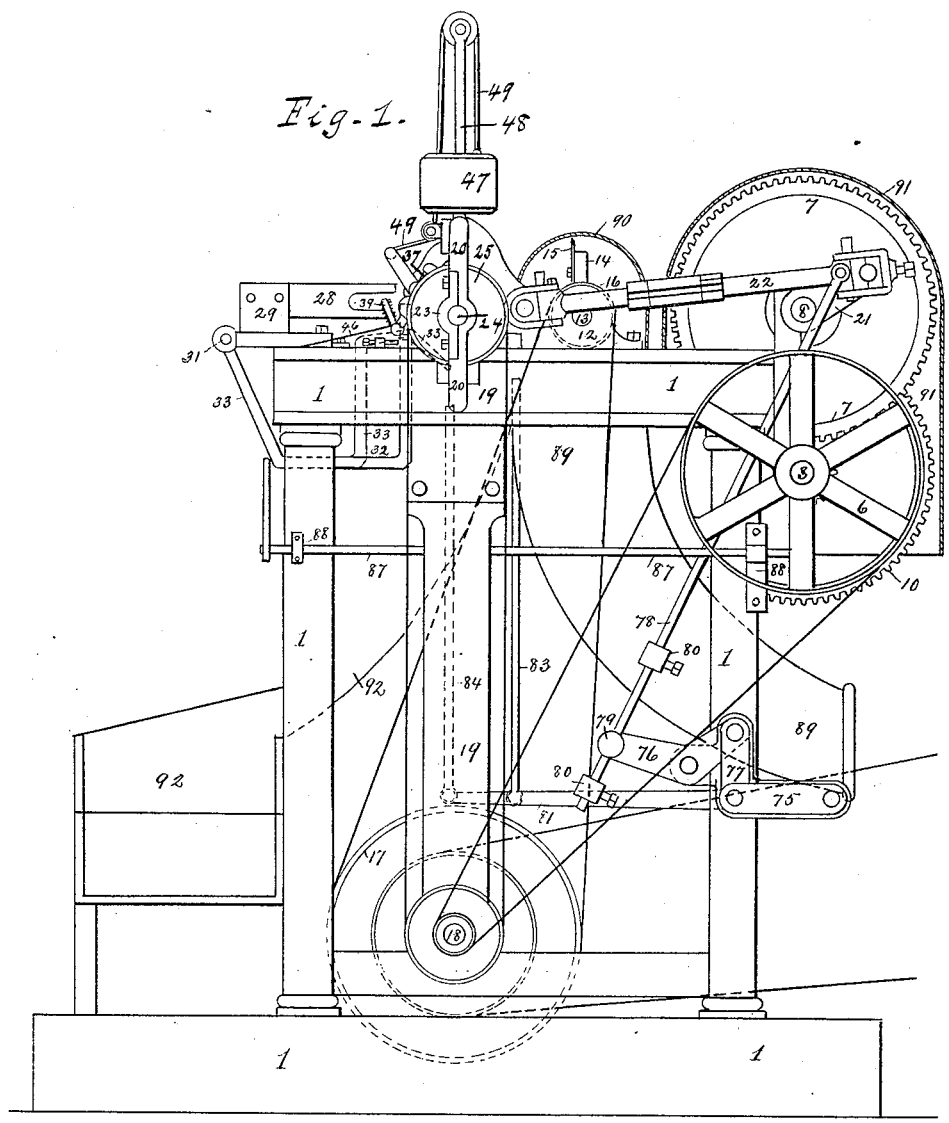
Figure 6:
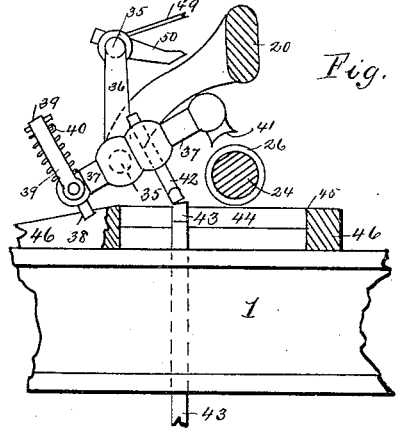
Figure 5:
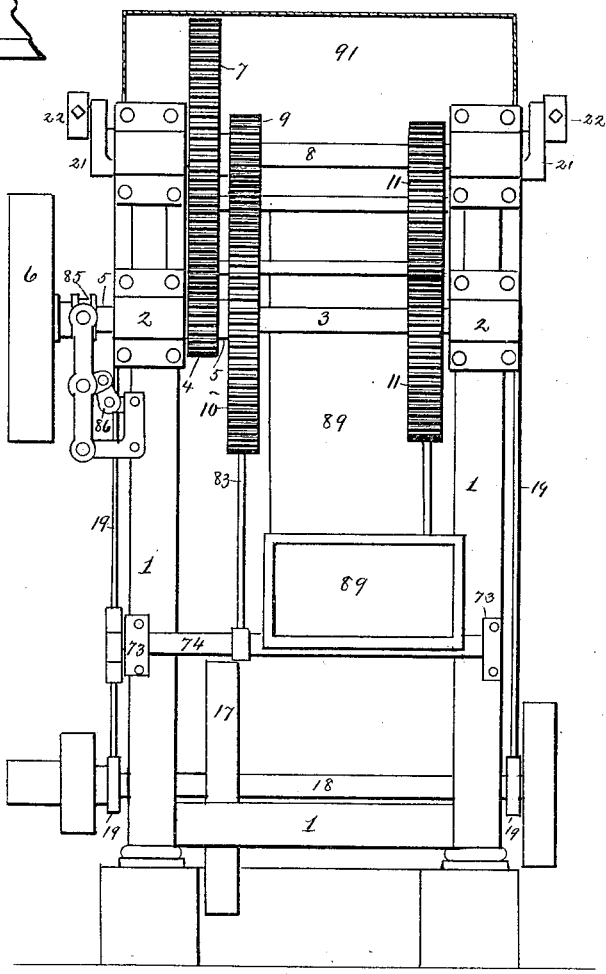

In the accompanying drawings, Figure 1 is a side elevation of my improved machine. Fig. 2 is a plan view of the same. Fig. 3 is an enlarged plan view of the device for regulating and controlling the tension on the pins and also securing the same in position. Fig. 4 is an enlarged elevation of a finished insulator-pin, such as are manufactured by this machine. Fig. 5 is a rear elevation of the machine. Fig. 6 is an enlarged side elevation of the threading device, partly shown in section the better to show its working parts.

To put my invention into practice and give the same bodily form, I erect a strong frame, 1, of suitable size and form of construction. Across the rear end of this frame 1, I arrange in suitable bearings, 2, a shaft, 3, carrying a pinion, 4, secured to a sleeve, 5, to one end of which is attached a driving-pulley, 6. This pinion 4 meshes with a large toothed wheel, 7, placed above on a parallel shaft, 8, and revolving loosely about the same, a small pinion, 9, secured to the large toothed wheel 7, meshing with another toothed wheel, 10, which is firmly secured to the shaft 3, thus giving the same a slow but powerful rotation on its axis. The elliptic gear-wheels 11, secured to the shafts 3 8, rotate the latter, to which the table 20 is attached by cranks 21 and connecting-rods 22, thus giving the cutter-head 14 time at one end of the stroke to shape the block or pin, and at the other end of the stroke time for taking up the pin.

Across the frame 1 is affixed in proper bearings, 12, a strong shaft, 13, having secured thereto a revolving cutter-head, 14, the knives 15 of which are shaped to conform to the sides of a finished pin. (See Fig. 4.) Secured to the shaft 13, carrying the cutter-head 14, is a small pulley, 16, connected to a larger pulley, 17, by a belt placed on a shaft, 18, secured to the frame 1 near the base. Loosely attached to this shaft 18, at the base of the frame 1, are vertical arms 19, which carry at their top a horizontally-moving table, 20, attached to cranks 21 by adjustable pitmen or connecting rods 22, which give the table 20 a backward and forward movement. Secured to this table 20, in suitable bearings, 23, is a short shaft, 24, having attached thereto a small pulley, 25, and tapering screw-thread 26, used in threading the pins, as will be more fully described hereinafter.

On the top of the frame 1, near the front, is secured two parallel rests, 27, placed between broad flat springs 28, attached to vertical uprights 29. Between these springs 28 the block or piece of wood is placed prior to the table 20 taking up the same. To the front of the frame 1 is secured in bearings 30 a short shaft, 31, to which is attached three arms, two of which, 32, act as points of adjustment for the block or piece of wood when placed in position, and the third arm, 33, as a means of moving the first-mentioned arms, 32, clear of the block when on its way to the cutter-head 14.

Secured to the moving table 20, in proper bearings 34, is a shaft, 35, bent in the form of a crank, 36, and so arranged that it may move a short distance in direction of its length. To one end of this shaft 35 is firmly attached a short piece, 37, placed in an oblique position, having at one end a vertical rod, 38, placed in a frame, 39, and actuated by a spiral spring, 40. At the other end of the oblique piece 39 is secured a short projection, 41, curved at the base to correspond with the tapering thread or screw 26, formed on the shaft 24. Near the middle of the oblique piece 37 is placed a downwardly-projecting foot, 42, which, when the table 20 is moving toward the cutter-head 14, rests on a vertical hinged arm, 43, which carries the oblique piece 37 across the opening 44, and deposits the same on the opposite edge, 45, of the guide 46. The hinged arm 43 is thrown back to the opposite end of the opening 44. The table 20, carrying the shaft 35, to which the oblique piece 37 is attached, when on the return releases the downwardly-projecting foot or rest 42 from the edge 45 of the slide 46, and allows the foot 42 to drop, and in so doing brings the projection 41 in contact with the tapering screw-thread 26, and the threader 50 against the pin secured in the table 20. The tapering screw-thread 26 revolving at a rapid rate, quickly carries the shaft 35 in the direction of its length, and thereby forming a screw-thread, 47, on the pin (see Fig. 4) of the same taper and pitch as that on the shaft 24. By this time the moving table 20 has brought the downwardly-projecting foot or rest 42 in contact with the top of the hinged arm 43, which causes the oblique piece 37 to revolve, and thereby lifting the projection 41 out of the tapering screw 26. A heavy weight, 47, moving vertically on an upright slide, 48, is secured to the shaft 35 by a rope, 49, which regulates the pressure of the threader 50 against the pin, and also serves to bring the projection 41 in contact with the tapering screw-thread 26. The shaft 35, to which the threader 50 and oblique piece 37 are attached, is brought back to position by the projecting rod 38 following the bent side of the guide 46. (See Fig. 2.) A knocker, 93, attached to the shaft 35, regulates the depth of the screw-thread on the pin by falling against the adjustable slide 94 on the table 20.

On the inner end of the shaft 24 is formed a dovetail for holding one end of the pin, such as are in common use on all wood-turning machines. The other end of the block or pin revolves on a pivot, 57ª, formed on the end of a shaft, 52, placed in a boss, 53, attached to the opposite end of the table 20 to that before described. This shaft 52, by means of a spiral spring confined in the boss 53, is capable of moving a short distance in the direction of its length. To the opposite end of the shaft 52 is loosely attached a lever, 54, fulcrumed to a projecting arm, 55, of the table 20, and at about the same distance on the other side of the shaft 52 is secured a short connecting-rod, 56, to one end of which is attached by a short pin, 57, a hook, 58, which engages with a ratchet-bar, 59, placed at an angle on a stationary plate, 60, secured to the frame 1. To the lower end of the pin 57 is secured one end of a bell-crank, 61, pivoted to the table 20 by a vertical rod or pin, 62. To the other end of the crank 61 is secured an upright catch or short pin, 63, which engages with an offset or notch, 64, formed on the side of a lever, 65, pivoted at one end and held in position by a spring, 66, at the rear. An adjustable pin, 67, is secured to the crank 61, which releases the pin 63 from the notch 64 at a given time. The pin 57, projecting a short distance below the bell-crank 61, is caught by a notch, 67, formed in a trigger, 68, a short time before the pin 63 on the other end of the crank 61 releases its hold. The trigger 68 is brought in contact with an adjustable pin, 69, secured to the frame 1 by the movement of the table 20. A spiral spring, 70, secured to the hook 58 and placed in a frame, 71, attached to the connecting-rod 56, presses the hook 58 against a vertical pin, 72, and holds the same in position.

Across the rear of the frame 1, and arranged in suitable bearings, 73, is a shaft, 74, to one end of which is attached a crank, 75, connected to another, 76, of suitable size and shape, by a short connecting-link, 77. From one of the pitmen 22, operating the table 20, a connecting-rod, 78, joins the crank 76 by being loosely passed through a boss, 79, formed on one end of the crank 76. The adjustable collars 80 regulate the movement and operate the shaft 74 at the proper time. To this shaft 74 are secured two inwardly-projecting arms, 81, which operate the flap 82, secured to vertical rods 83, which closes the opening communicating with the cutter-head 14, and prevents the finished pin, when displaced by the vertical rod 84, attached to one of the arms 81, from injury by coming in contact with the cutter-head 14.

A clutch, 85, on the sleeve 5, to which the pinion 4 is attached, is operated by the crank 86, secured to the rod 87, fixed in suitable bearings, 88, and serves to throw the pulley 6 out of gear and stop the machine.

A bent trough, 89, and cover 90 inclose the cutter-head 14 on all sides but the front, and carrying the chips or cuttings to the rear of the machine and preventing them from interfering in any way with the working of the several parts. The gear-wheels at the rear of the machine, together with the shafts, are covered by a hood, 91, which protects the same.

Another trough, 92, is placed below the table 20, which receives the finished pins and discharges the same forward.

The operation of my improved machine is as follows: A piece or block of wood is placed between the springs 28 and pressed against the uprights 32. The table 20, suspended to the vertical arms 19, when moving back from the cutter-head 14 strikes the top of the bent arm 33, secured to the shaft 31, and moves the uprights 32 downward a short distance out of the way. At the same time the pin 63, engaging with the notch 64 in the stationary lever 65, holds the bell-crank 61 at one end and revolves the same about its pivotal point 62. The other end of the crank 61, being attached by the connecting-rod 56 to the lever 54, forces the same away from the machine, and in so doing draws the shaft 52 in the same direction. The pin 57, at one end of the bell-crank 61, has by this time entered and is secured by the notch 67 in the trigger 68, and the crank 61, still moving, brings the adjustable screw-point 93 in contact with the side of the lever 65, releasing the pin 63 from the notch 64. The crank 61 is still held in the same position by the trigger 68. The table 20 moves forward until the two shafts 24 and 52 are in a direct line with the center of the block of wood between the springs 28, and at that moment the trigger 68, striking the adjustable pin 69, releases the shaft 52, and the strong spiral spring about the same shaft, 52, drives the point or pivot 57ª and dovetail into the block of wood, firmly securing the same between the two shafts 24 and 52. The table 20 at this point commences the return movement. The hook 58, engaging with the stationary ratchet 59, forces the pivot 57ª and dovetail still deeper into the block while the end of the hook 58, secured to the pin 57, is moving forward, thus giving each piece or block of wood the same tension, should they vary in length. The table 20, on its way to the cutter-head 14, releases the uprights 32, and another block is placed in position. The block having reached the cutter-head 14 remains there a short time by means of the slow movement imparted to the cranks 21 while crossing their centers and also aided by the elliptic gearing 11 until the block is shaped. A short time before the block has reached the cutter-head 14 the downwardly-projecting foot 42 is conveyed across the opening 44 by the hinged arm 43, and deposited on the opposite edge, 45, and the hinged arm 43 thrown back to its former position. The block now being shaped, the table 20 on its way back moves the projecting foot 42 from the edge 45, and the weight 47, acting on the crank 36, drops the projection 41 into the tapering screw-thread 26 on the shaft 24, and also brings the threader 50 in contact with the pin. The shaft 24, revolving rapidly, carries the projection 41 down the tapering-screw 26, and the projection being attached to the shaft 35, to which the threader 50 is secured, gives the screw-thread 47 on the pin the same taper and pitch as that of the thread 26 on the shaft 24. The table 20 by this time has brought the projecting foot 42 in contact with the hinged arm 43, and in moving a short distance further revolves the oblique piece 37, thereby raising the projection 41 out of the thread or screw 26, and moving down the slide 46 remains in the same position. The adjustable collar 80 at this time acts on the crank 76, and pressing the same down imparts the motion to the inwardly-projecting arms 81, lifting the same. The flap 82, being attached thereto, moves over the opening communicating with the cutter-head 14. The rod 84, attached to one of the arms 81, being somewhat shorter, strikes the finished pin at this time, and releases the same immediately after the trigger 68 has been again set. Another block is now taken up in the manner previously described. The chips or cuttings of wood are carried down the trough 89 to the rear of the machine, while the finished pins are discharged at the front.

Having thus described my invention, what I claim, and desire to secure by Letters Patent, is—

1. The combination of the table 20, receiving fast and slow movements by the means described and sustained by vertical arms 19, the two parallel rests arranged at the front of the frame between two broad flat springs for gripping the ends of the blanks, the two arms 32, serving as points of adjustment for the blanks, the rocking shaft 31, bearing these arms, and also an angular arm, 33, a horizontally-moving table, 20, bearing the shaft 24, carrying screw-threading devices and also an endwise-movable gripping and centering device for the blanks, and adapted, as described, for actuating the arms 32 and 33, and also the threading-tool, and devices for giving endwise movements to the threading-tool shaft, substantially as described.

2. The combination of a rocking shaft, 35, bearing the threading-tool and the oblique piece 31 and actuated by a weight and cord, the spring-actuated rod 38 on said piece, the bent guide 46, fixed to the main frame, adapted to act on and give endwise return movement to the threading-tool shaft, the projection 41 on the piece 37, adapted to follow the thread-former 26, and a horizontally-moving carriage, 20, bearing the latter and the blank-holding devices, substantially as described.

3. In a machine for making insulator-pins with threaded ends, the combination, with a horizontally-moving table suspended by vertical arms, of adjustable pitmen receiving motion from a main shaft through the medium of a train of circular and elliptical gears and cranks, the spring-clamping arms at the front of said table for moving the blanks forward, the gripping and centering devices arranged between said arms and the rotary cutters, and threading devices similarly arranged, substantially as described.

4. The combination, with the reciprocating horizontal table 20, bearing the devices described, of a bell-crank, 61, pivoted to the top of the main frame and connected by a link to the lever 54, and provided with a short pin, 63, adapted at times to engage with a catch on a lever, 65, acted on by a spring, and an adjustable screw, 93, also adapted to press against an inclined edge of lever 65, a trigger, 68, notched at 67, and provided with a spring, 70, and adjustable stop 69, the hook 58, pivoted to lever 61, the ratchet-bar 59, and the endwise-movable rod provided with a centering-point for the blanks, all substantially as described.

CHARLES ROGERS.

Witnesses:
H. T. MORRIS,
JAS. A. NICHOLAS.